(No Model.)
G. B. IRWIN.
POTATO HARVESTER.
No. 473,317.　　　　　　　　　Patented Apr. 19, 1892.
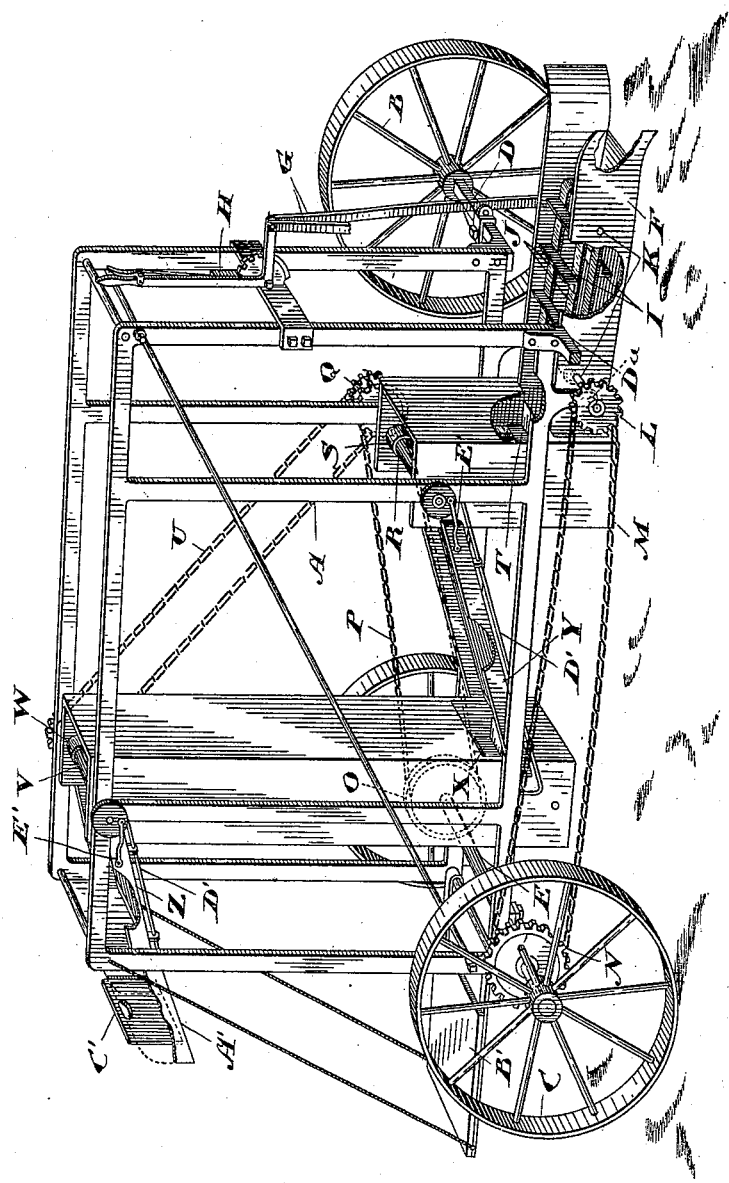
Witnesses
J. Edw. Maybee
W. G. McMillan.
Inventor
George B. Irwin
by
Donald C. Ridout & Co.
Attys.

UNITED STATES PATENT OFFICE.

GEORGE B. IRWIN, OF TORONTO JUNCTION, CANADA.

POTATO-HARVESTER.

SPECIFICATION forming part of Letters Patent No. 473,317, dated April 19, 1892.

Application filed July 16, 1891. Serial No. 399,756. (No model.)

*To all whom it may concern:*

Be it known that I, GEORGE B. IRWIN, of the town of Toronto Junction, in the county of York, in the Province of Ontario, Canada, have invented a certain new and Improved Potato Digger and Picker, of which the following is a specification.

The object of the invention is to design a simple machine to dig, sift, and bag potatoes with no more manual labor than is necessary to handle the bags; and it consists, essentially, of a frame suitably supported on ground-wheels and provided with a vertically-adjustable digger designed to excavate the potatoes and bring them in contact with horizontally-traveling buckets, which convey them to elevating-buckets, which raise and deposit them upon a vibrating sieve designed to separate the earth from the potatoes, which latter fall upon a second set of elevating-buckets arranged to raise the potatoes to the top of the machine, where they fall on a second vibrating sieve designed to remove any remaining earth before they are discharged from the spout into bags handled by the operator, substantially as hereinafter more particularly explained, and then definitely claimed.

The drawing represents a perspective view of my improved potato digger and picker, portions being broken away to expose the interior construction.

In the drawing, A represents a light frame suitably supported by the wheels B and C. The front wheels B are journaled on a stationary axle D, while the rear wheels are fixed to an axle E, suitably journaled in boxes on the frame A.

F is a shovel or digger hinged to the frame A at *a* and supported by the links G, which are attached at their upper ends to a crank-lever H, suitably pivoted upon the frame A and provided with a spring-catch, so that it may be held at any desired angle necessary to elevate or to depress the digger F, as indicated. A series of buckets I are connected to endless belts J, suitably supported on rollers K. On the spindle of one of the rollers K, I fix a sprocket-wheel L, which is connected by a sprocket-chain M to the sprocket-wheel N, fixed to the revolving axle E. On this axle is also fixed a sprocket-wheel O, connected by the sprocket-chain P to the sprocket-wheel Q, fastened to the spindle of the roller R, which forms the upper support to the endless belt S, on which the elevating-buckets T are fixed. Another sprocket-wheel is connected to the spindle of the roller R, on which sprocket-wheel the sprocket-chain U is placed to connect the roller R with the roller V, which supports the endless belts W on which the elevating-buckets X are attached. From this description it will be seen that when the machine moves forward all the buckets I, T, and X move in the proper direction to accomplish their work.

In order to put my machine at work, I connect a pair of horses to it and adjust the digger F, so as to enter the potato-row. When the machine moves forward, the digger F excavates the potatoes and throws them against the traveling buckets I, which carry them toward the elevating-buckets T. These elevators raise the potatoes and discharge them onto the vibrating sieve Y. This sieve is set at an angle, so that the potatoes will roll toward the elevating-buckets X, the earth and very small potatoes being sifted through the sieve Y. When the potatoes come in contact with the elevating-buckets X, they are elevated and discharged onto the vibrating sieve Z, from which they roll onto the discharge-spout A'.

While the machine is at work a man stands on the platform B' to hold a bag at the mouth of the spout A' to receive the potatoes. As each bag is filled, he closes the spout A' by means of the slides C', so as to prevent the potatoes from escaping from the spout until he has had an opportunity of replacing the full bag with an empty one. There are many ways of supporting the sieves, so that they will vibrate. In the plan shown the sieves are movably supported on rods D' and are connected by means of a pitman E' to the nearest revolving roller. It will be seen that as the buckets I come in contact with the earth and soil on the spade or digger F they press down upon the same, and should there be any lumps of soil they will be broken up by the pressure of the buckets as the soil passes underneath them.

What I claim as my invention is—

An improved potato digger and picker comprising a vertically-adjustable shovel, a set of traveling buckets arranged immediately above the shovel to break up the soil and convey the potatoes toward the rear, a second set of elevating-buckets inclosed in a suitable casing to raise said potatoes, a vibrating screen to receive them from the buckets, arranged to sift out the soil and guide the potatoes farther to the rear, a third set of buckets arranged to carry the potatoes to a higher elevation and deliver them to a second screen and to a bagging-spout, all substantially as described.

Toronto, July 9, 1891.

GEORGE B. IRWIN.

In presence of—
 A. M. NEFF,
 I. E. MAYBEE.